Patented Jan. 20, 1942

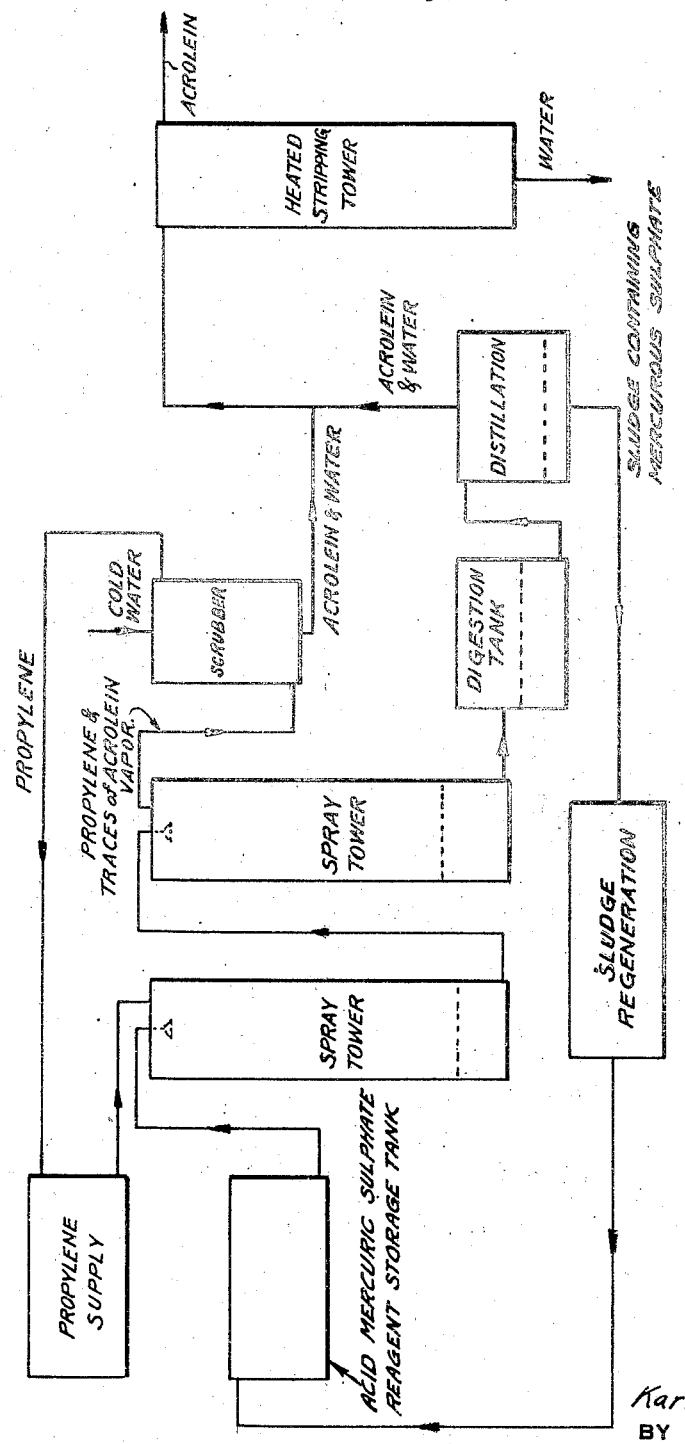

2,270,705

UNITED STATES PATENT OFFICE 2,270,705

PRODUCTION OF ACROLEIN

Karl M. Herstein, Brooklyn, N. Y., assignor to Acrolein Corporation, a corporation of Delaware Application September 27, 1939, Serial No. 296,771

7 Claims. (Cl. 260—604)

This invention relates to the production of acrolein with the use of a mercuric sulphate reagent.

The invention provides a process by which acrolein of a high degree of purity may be readily obtained. The process is adapted for continuous, semi-continuous or non-continuous operation.

In accordance with my invention propylene gas is absorbed by a mercuric sulphate reagent at a temperature sufficiently low so that there is substantially no conversion of propylene into acrolein, the resulting composition then being heated to a higher temperature to convert absorbed propylene into acrolein.

It is known that propylene is absorbed at a temperature of about 85° C. by a mercuric sulphate reagent known as Denige's reagent with the production of a precipitate which, upon further heating, decomposes with the liberation of acrolein. Denige's reagent is prepared from about 5 parts by weight of mercuric oxide, about 36.8 parts by weight of sulphuric acid (66° Bé.) and about 100 parts by weight of water.

I have found that a mercuric sulphate reagent prepared from mercuric oxide, sulphuric acid and water in the proportions characteristic of Denige's reagent, or in other proportions, will absorb propylene at a temperature below 70° C., advantageously at about 20° C., with the production of what I believe to be an addition compound of propylene and mercuric sulphate. The addition compound is soluble in the reagent and is stable for a few hours at room temperature. Upon decomposing it evolves propylene gas. No detectable quantities of acrolein are produced. At about 0° C. the addition compound will remain stable for about 24 hours. So far as I am aware this somewhat unstable addition compound will be formed at temperatures up to 70° C. and upon decomposing at temperatures up to 70° C. it will give off propylene gas, no significant amounts of acrolein being produced; above 70° C. the addition compound decomposes with the formation of substantial amounts of acrolein. The mercuric sulphate reagent will absorb about one mole of propylene for each mole of mercuric sulphate in the reagent, and the addition compound which I believe to be formed apparently has a composition corresponding to these proportions. The absorption reaction is slightly exothermic and cooling may be necessary to keep the temperature below 70° C.

I have further found that upon heating the mercuric sulphate reagent containing absorbed propylene to a temperature above 70° C., advantageously at about 85° C., propylene gas will be evolved. If the mercuric sulphate reagent has been saturated with propylene, i. e., if it has absorbed about one mole of propylene for each mole of mercuric sulphate in the reagent, about three-quarters of this initially absorbed propylene will be liberated on heating the reagent above 70° C. Concurrently with the liberation of propylene a precipitate is formed which appears to be a complex of mercuric sulphate and propylene. On further heating of the reagent above 70° C. the unliberated propylene is converted into acrolein with the simultaneous reduction of mercuric sulphate to mercurous sulphate which is deposited as a precipitate. The acrolein formed dissolves in the reagent and may be separated therefrom by suitable methods, e. g., by distillation.

The process of my invention thus comprises the absorption of propylene by a mercuric sulphate reagent at a temperature sufficiently low so that substantially no propylene is converted into acrolein, the resulting composition then being heated to a higher temperature to convert absorbed propylene into acrolein.

The proportions of mercuric oxide, sulphuric acid and water used in preparing the reagent used in my process may be varied considerably from those characteristic of Denige's reagent. In general, the sulphuric acid content of the reagent should not be less than that formed by the hydrolysis of mercuric sulphate in a water solution. An acidity which prevents the hydrolysis of mercuric sulphate, that is, when there is about 15% of $SO_3$ by weight in the solution, is particularly advantageous. As an upper limit, the amount of sulphuric acid should be no higher than about 25% by weight of $SO_3$ in excess of the amount necessary to produce mercuric sulphate with the mercuric oxide used in preparing the reagent. With a higher sulphuric acid content, there is a tendency for the propylene gas to react with the sulphuric acid and produce undesired reaction products. In addition, if a flash distillation process is used to recover the acrolein from the reagent, a high concentration of sulphuric acid is apt to cause the destruction of acrolein. A high sulphuric acid content also decreases the solubility of mercuric sulphate in the reagent.

The proportions of $SO_3$ to mercuric oxide may be varied over a wide range. A range of proportions of from .37 part by weight of $SO_3$ for each part of HgO up to .88 part $SO_3$ for each part of HgO, may be used with advantage. But the proportions of $SO_3$ to HgO may be still higher and may be as high as about 6 parts by weight of SO₃ to one part by weight of HgO.

The amount of water used in the reagent may also be varied. As a minimum, there should be at least enough water to keep the mercuric sulphate in solution. There should not be so much water, however, as to impair the volume efficiency of the apparatus used in carrying out the process.

My invention will be illustrated by the following specific example. In this example reference will be made to the accompanying drawing which shows in a conventional and diagrammatic fashion a flowsheet or an arrangement of apparatus adapted for practicing the process of my invention, it being understood that the invention is intended to be illustrated thereby but not limited thereto.

In the flowsheet a propylene supply and a reagent storage tank are shown conventionally. A mercuric sulphate reagent is prepared from 12.2 parts by weight of mercuric oxide, 27.5 parts by weight of sulphuric acid (66° Bé.) and 60.3 parts by weight of water. In carrying out the process propylene and the mercuric sulphate reagent are introduced at the top of a spray tower which is maintained under atmospheric pressure at a temperature of about 20° C. The amount of propylene and reagent entering the tower is regulated so that the reagent collecting at the bottom of the tower is substantially saturated with propylene. At 20° C. and atmospheric pressure 100 grams of the reagent will absorb about 1.3 liters of propylene.

The saturated reagent is then sprayed into a second tower which is maintained under atmospheric pressure at a temperature of about 85° C. Propylene gas is liberated. Traces of acrolein may also be formed and liberated as acrolein vapors. These may be removed from the propylene by passing the propylene-acrolein vapor mixture through a cold water scrubber which will absorb the acrolein vapors. The purified propylene is then returned to the propylene supply for reuse in the process. The flow of reagent through the second spray tower is adjusted so that substantially no propylene is evolved from the reagent by the time it leaves the second spray tower. Where the reagent has been saturated with propylene in the first spray tower, evolution of propylene in the second spray tower practically ceases when about three-quarters of the propylene initially absorbed has been liberated. At a temperature of 85° C. with an originally saturated reagent this will require about one-half hour.

From the second spray tower the reagent is passed into a digestion tank maintained at a temperature of about 85° C. The reagent is kept in this tank until the conversion of unliberated propylene into acrolein is substantially complete. This will require about one-half hour at 85° C. The formation of acrolein is accompanied by the precipitation of mercurous sulphate in the reagent. The acrolein formed dissolves in the reagent.

The acrolein is recovered by subjecting the reagent to steam distillation. This causes the volatilization of the acrolein and it passes off from the reagent in admixture with water vapor. The resulting water-acrolein mixture is passed into a heated stripping tower from which substantially pure acrolein is recovered. The water-acrolein mixture collected from the propylene cold water scrubber is also passed through this heated stripping tower.

The spent reagent in the form of a sludge containing mercurous sulphate and various organic impurities is drawn off from the distillation apparatus and subjected to a suitable regeneration treatment. The sludge may be regenerated by the process described in my co-pending application Serial No. 296,772. The regenerated reagent is returned to the reagent storage tank for reuse in the process.

Instead of using a concurrent flow of propylene and reagent in the propylene absorption stage of my process other suitable methods may be used; countercurrent flow may, for example, be used with advantage, or the propylene may be merely bubbled into a body of the reagent.

By proper regulation of the various stages in the process acrolein may be produced in a substantially continuous or semi-continuous manner. The process may also be carried out as a batch or non-continuous process, that is to say, the production of acrolein need not be carried out by using a series of reaction vessels to which propylene is continuously supplied. If desired, the entire process may be carried out in one reaction vessel. For example, a mercuric sulphate reagent in a reaction vessel may be saturated with propylene at a temperature of about 20° C. under atmospheric pressure. The supply of propylene may then be cut off and the reagent in the vessel heated to a temperature of about 85° C. The evolved propylene is collected, water-scrubbed to remove traces of acrolein and returned to the propylene supply. The heating of the reagent is continued until the conversion of unliberated propylene into acrolein is substantially complete. The acrolein dissolves in the reagent and may be separated therefrom by steam distillation in the same reaction vessel. The water-acrolein mixture resulting from the steam distillation may be passed into a heated stripping tower for recovery of substantially pure acrolein. The spent reagent in the form of a sludge containing organic impurities and mercurous sulphate may be drawn off from the reaction vessel, regenerated and returned to the reagent storage tank. The reaction vessel may then be resupplied with fresh reagent and the process repeated. Other variations may be made in the manner in which my process is practiced without departing from the scope of my invention.

The temperature during the first stage of the reaction, i. e., during the absorption of propylene by the reagent, is advantageously around 20° C., although it may be somewhat lower and it may be as high as 70° C. The propylene absorption reaction is somewhat exothermic and it may be necessary to cool the reaction chamber in order to keep the temperature from rising above 70° C.

After the initial absorption stage, the temperature is advantageously raised to about 85° C., although it may be as low as 70° C. It may be substantially higher than 85° C., but it should be no higher than the boiling point of the composition being heated.

The initial absorption step may be carried out under atmospheric pressure, but it may also be carried out with advantage at somewhat higher pressures of the order of two or three atmospheres. The absorption of propylene by the reagent becomes more rapid as the pressure is increased.

In my detailed description of the process, the initial absorption of propylene by the reagent has been continued until the reagent is saturated. It is to be understood that the reagent need not be completely saturated in order to practice my process, although I have found the use of a saturated reagent to be of advantage from a practical standpoint. If the reagent is not completely saturated with propylene during the initial absorption stage, the amount of propylene evolved when the reagent is subsequently heated above 70° C. will be less than three-quarters of the amount of propylene initially absorbed. The amount evolved will depend upon the degree of initial saturation.

Instead of recovering acrolein from the reagent by steam distillation, vacuum or flash distillation or other suitable methods may be advantageously used.

I claim:

1. The method of producing acrolein which comprises substantially saturating a mercuric sulphate reagent with propylene at a temperature below 70° C. and heating the resulting composition to a temperature above 70° C. to effect conversion of propylene into acrolein.

2. The method of producing acrolein which comprises substantially saturating a mercuric sulphate reagent with propylene at a temperature of about 20° C. and heating the resulting composition to a temperature of about 85° C. to effect conversion of propylene into acrolein.

3. The method of producing acrolein which comprises substantially saturating a mercuric sulphate reagent with propylene at a temperature below 70° C., heating the resulting composition to a temperature above 70° C. to effect conversion of propylene into acrolein and then distilling the reaction mixture to recover the acrolein formed.

4. The method of producing acrolein which comprises substantially saturating a mercuric sulphate reagent with propylene at a temperature below 70° C., heating the resulting composition to a temperature above 70° C. to effect conversion of propylene into acrolein and then steam distilling the reaction mixture to recover the acrolein formed.

5. The method of producing acrolein which comprises substantially saturating a mercuric sulphate reagent with propylene at a temperature below 70° C., heating the resulting composition to a temperature above 70° C. to effect conversion of propylene into acrolein and then vacuum distilling the reaction mixture to recover the acrolein formed.

6. The method of producing acrolein which comprises substantially saturating a mercuric sulphate reagent with propylene at a temperature below 70° C., heating the resulting composition to a temperature above 70° C. to effect conversion of propylene into acrolein and then flash distilling the reaction mixture to recover the acrolein formed.

7. The method of producing acrolein which comprises substantially saturating a mercuric sulphate reagent with propylene at a temperature of about 20° C., heating the resulting composition to a temperature of about 85° C. to effect conversion of propylene into acrolein and then steam distilling the reaction mixture to recover the acrolein formed.

KARL M. HERSTEIN.